This invention relates to a telescopic support particularly adapted among other things for high chairs, stools, stands, etc., and the principal object of the invention resides in the provision of a very sturdy and rugged telescopic support comprising a pair of telescopic cylinders having a pawl and rack construction for adjustably maintaining the same at any point of adjustment in the telescoping action thereof; including means for moving the pawl out of engagement with the rack at the limit of adjustment so as to allow the telescoping cylinders to be returned to a telescoped point, at which time the means of putting the pawl out of action is automatically reinstated to once more provide for the adjustable motion described.

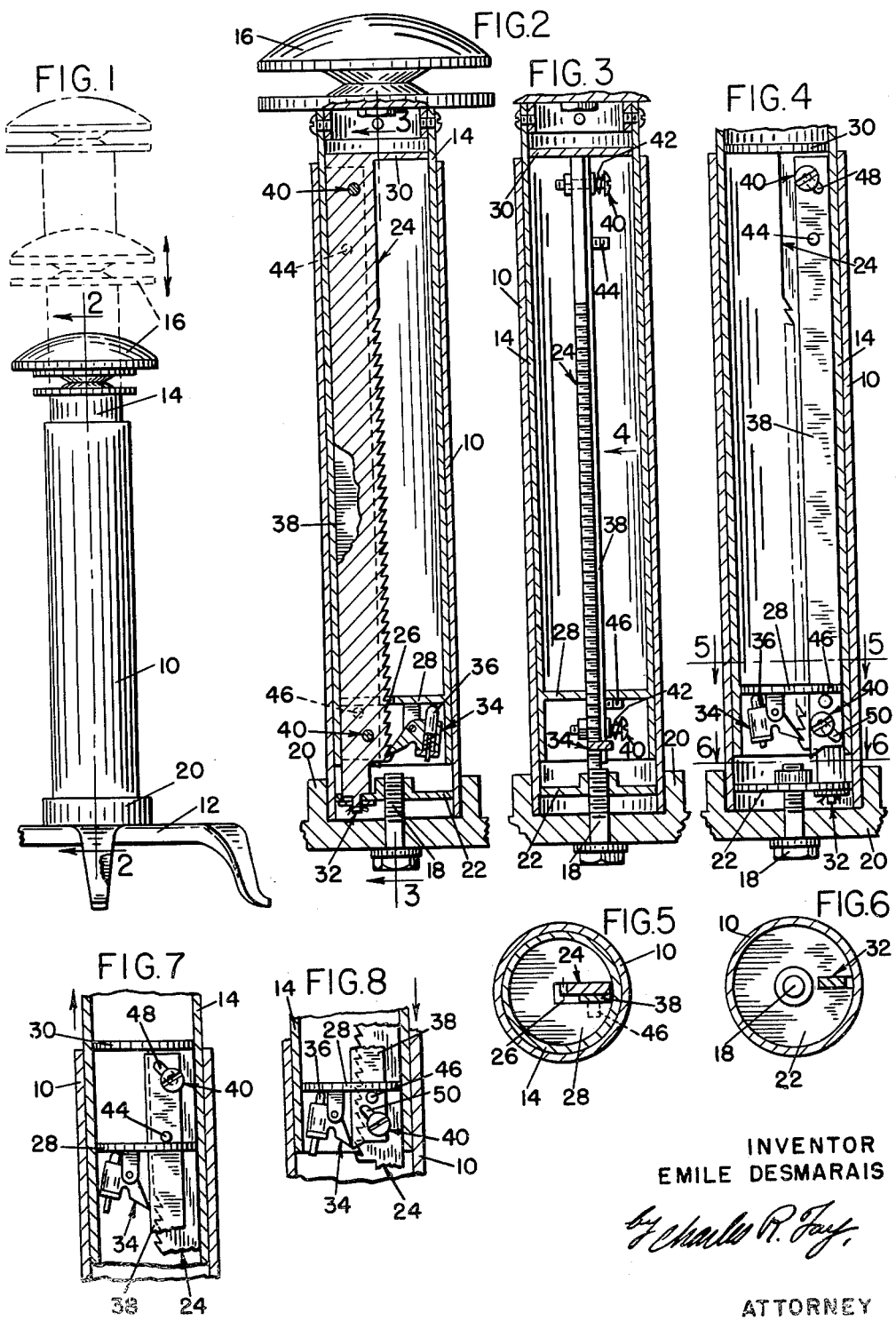
Nov. 20, 1962 E. DESMARAIS 3,064,934
TELESCOPIC SUPPORT
Filed Jan. 5, 1962
INVENTOR
EMILE DESMARAIS
ATTORNEY 3,064,934
TELESCOPIC SUPPORT
Emile Desmarais, 73 Webster St., Winchendon, Mass.
Filed Jan. 5, 1962, Ser. No. 164,436
3 Claims. (Cl. 248—409)

The invention further relates to arrangements and combinations of parts which will be hereinafter described and more particularly set forth in the appended claims.

Reference is to be had to the accompanying drawings, in which

FIG. 1 is a view in elevation illustrating the invention;

FIG. 2 is a longitudinal vertical section taken on line 2—2 of FIG. 1 and on an enlarged scale;

FIG. 3 is a section on line 3—3 of FIG. 2;

FIG. 4 is a view partly in section and partly in elevation, looking in the direction of arrow 4 in FIG. 3;

FIGS. 5 and 6 are sectional views taken on the respective lines in FIG. 4, and

FIGS. 7 and 8 are detail views partly in section and partly in elevation illustrating the operation of the device.

In carrying out the present invention there are provided two telescoping cylinders, one of these cylinders being indicated at 10 and mounted on any kind of base desired such as that at 12. The other cylinder is indicated at 14 and, as is illustrated herein, it telescopes within cylinder 10 and is provided at its upper end with some kind of supporting medium such as for instance a seat 16. Any other kind of seat, chair, etc. or any other device desired may be mounted on the upper end of the cylinder 14.

As shown in FIGS. 2, 3 and 4, some kind of bolt arrangement such as that at 18 can be utilized to mount the fixed cylinder 10 on the base as for instance in a cup or collar of rugged construction indicated at 20. The bolt 18 may thread into a plate 22 fixed across the lower end of cylinder 10 and this plate may also form a basis for the fixed mounting of an elongated vertical rack which is generally indicated by the reference numeral 24.

The rack 24 extends freely through a slot at 26 in a plate 28 which is secured interiorly and transversely to the interior telescoping cylinder 14. At its upper end the rack is secured to a plate 30 which is loosely mounted in respect to the interior of the cylinder 14 so that cylinder 14 can be telescoped with relation to cylinder 10. At the same time, rack 24 is fixedly mounted on the plate 22 by any desired means such as for instance the extending projection and cotter pin generally indicated at 32 for easy assembly of the parts.

The pawl is pivoted and indicated generally at 34 and it is provided with some spring member such as at 36 biasing it toward the teeth on the rack 24. In this case there is a spring-pressed detent which bears on the underside of the plate 28 which is fixed to cylinder 14, and it will be seen that the pawl therefore can be biased out of engagement with the teeth of the rack.

This action is shown in FIG. 7 and the construction by which it is accomplished is provided by means of an elongated bar 38 which is generally coextensive with the rack and may be mounted thereon by some kind of spring-pressed mechanism such as is indicated at 40 (see FIG. 3). In this case there is shown a bolt which extends through both the bar 38 and the rack 24, there being a spring as indicated at 42 pressing a washer against the side of the bar 38 to keep it more or less in contact with the side of the rack 24. This construction is duplicated at the upper end of the rack as is perhaps best shown in FIGS. 3 and 4. The bar also has a pair of outstanding projections 44, 46 for a purpose to be described.

It will be noted that the bolts which comprise a part of the mechanism at 40 extend through inclined slots 48 and 50, which slots are located in the bar 38. Due to the fact that the bar is not rigidly connected to the rack, it will be seen that the bar therefore has a relative motion with respect to the rack at an incline thereto limited by the spring fastener 40. The bar may be extended or maintained to the rear of the teeth so that the teeth are effective (see FIGS. 2 and 4), but upon being moved in an upward direction, the bar 38 assumes the position shown in FIGS. 7 and 8 covering the teeth of the rack 24 and making them inoperative with respect to the pawl 34.

The pawl 34 is arranged on its plate 28 opposite to the rack and the bar 38 so that in the retracted position of bar 38 the pawl engages the rack teeth. In the projected position of the bar as in FIGS. 7 and 8, the pawl is made inoperative with respect to the rack.

In the operation of the device, assuming that the parts are in the FIG. 2 position which is at the lowermost extent of the member 16, it is merely necessary to pull upwardly on the member 16 and this will draw upwardly inner cylinder 14 together with its fixed plate 28 and the pawl. The pawl will bear on the teeth of the rack and will cause the parts to be latched at whatever point the member 16 is raised to. This action will continue until such time as the plate 28 (see FIG. 7) rises high enough to engage projection 44, whereupon the bar 38 will be urged upwardly by the plate 28, but due to the inclination of slot 48 the bar will move to the left in FIG. 7, immobilizing the pawl with repect to the rack 24. The member 16 and inner cylinder 14 together with the pawl can all then descend by gravity down to the lowermost position thereof, at which point the projection 46 is engaged by the under side of plate 28 and this action lowers bar 38, causing it to be retracted to the right of the teeth of the rack (see FIG. 4) or to the left of the teeth of the rack (see FIG. 1).

This invention provides an extremely sturdy and rugged construction of the class described and it will find general utility in any extensible telescopic supports of the class described although it is particularly adapted for stools, seats, high chairs, and devices of like nature.

Having thus described my invention and the advantages thereof, I do not wish to be limited to the details herein disclosed, otherwise than as set forth in the claims, but what I claim is:

1. A telescoping support comprising a pair of generally cylindrical telescopic members, a cross plate adjacent the end of the outer member, a toothed rack fixedly mounted at one end onto said plate and extending substantially through the length of the outer member and in the inner member, a second plate in the inner member adjacent an end thereof, and parallel to the first-named plate, said second-named plate having a slot through which the rack projects, a pivoted pawl mounted on the second plate, said pawl being spring biased toward the rack, a bar movably mounted on the side of the rack and having two positions, one in which the bar projects forwardly beyond the teeth of the rack and engages the pawl to provide that the pawl and the rack are inoperative and the other position being a retracted position in which the teeth of the rack are exposed and the pawl is in engagement therewith, and means including lateral projections on the rack adjacent the ends thereof and slots in the bar through which the projections extend, the slots being inclined relative to the axis of the members, said projections extending into the path of the second-named plate to be engaged thereby at the ends of the telescopic motion of the members, said projections moving the bar between the retracted and projected positions thereof for providing selectively the inoperative condition of the pawl with respect to the rack at one limit of adjustment of the two members and being retracted to allow operation of the pawl and the rack at the other limit of adjustment of the two members.

2. The telescoping support of claim 1 including a support connected to one end of the outer member adjacent to the first-named plate thereon.

3. The telescoping support of claim 1 including a supported element at the end of the inner member opposite the second plate.

References Cited in the file of this patent

UNITED STATES PATENTS

| | | |
|---|---|---|
| 325,044 | Blackburn | Aug. 25, 1885 |
| 504,683 | Peartree | Sept. 5, 1893 |

FOREIGN PATENTS

| | | |
|---|---|---|
| 356,925 | Germany | Aug. 7, 1922 |